US008285825B1

(12) United States Patent
Nagaraj et al.

(10) Patent No.: US 8,285,825 B1
(45) Date of Patent: Oct. 9, 2012

(54) METHOD AND SYSTEM FOR MANAGING NETWORK RESOURCES BASED ON A DYNAMIC QUORUM

(75) Inventors: Shishir Nagaraj, Bangalore (IN); Nataraj Sirisilla, Yousufguda (IN); Honnuduke S. Madhusudhana, Bangalore (IN)

(73) Assignee: Novell, Inc., Provo, UT (US)

( * ) Notice: Subject to any disclaimer, the term of this patent is extended or adjusted under 35 U.S.C. 154(b) by 1774 days.

(21) Appl. No.: 10/293,827

(22) Filed: Nov. 13, 2002

(51) Int. Cl.
*G06F 15/16* (2006.01)
*G06F 15/173* (2006.01)

(52) U.S. Cl. .................. 709/223; 709/203; 709/219

(58) Field of Classification Search .......... 709/203–205, 709/219, 223–229, 241; 705/7–11; 726/27–30; 370/233, 395.2, 395.21, 395.41, 395.42
See application file for complete search history.

(56) References Cited

U.S. PATENT DOCUMENTS

| | | | | |
|---|---|---|---|---|
| 5,062,055 A * | 10/1991 | Chinnaswamy et al. | ..... | 702/182 |
| 5,706,452 A * | 1/1998 | Ivanov | ........................... | 715/751 |
| 5,754,939 A * | 5/1998 | Herz et al. | .................... | 455/3.04 |
| 6,119,230 A | 9/2000 | Carter | | |
| 6,163,855 A * | 12/2000 | Shrivastava et al. | ............... | 714/4 |
| 6,189,103 B1 | 2/2001 | Nevarez et al. | | |
| 6,192,365 B1 * | 2/2001 | Draper et al. | .................. | 707/101 |
| 6,192,401 B1 * | 2/2001 | Modiri et al. | .................. | 709/220 |
| 6,339,784 B1 * | 1/2002 | Morris et al. | .................. | 709/204 |
| 6,460,039 B1 * | 10/2002 | Pinter et al. | ............................ | 1/1 |
| 6,490,693 B1 | 12/2002 | Briskey et al. | | |
| 6,542,929 B1 * | 4/2003 | Briskey et al. | ................. | 709/223 |
| 6,615,256 B1 * | 9/2003 | van Ingen et al. | ............ | 709/220 |
| 6,633,835 B1 * | 10/2003 | Moran et al. | .................. | 702/190 |
| 6,662,219 B1 * | 12/2003 | Nishanov et al. | ............. | 709/220 |
| 6,671,818 B1 * | 12/2003 | Mikurak | ....................... | 714/4.21 |
| 6,741,981 B2 * | 5/2004 | McGreevy | ........................ | 707/3 |
| 6,748,447 B1 * | 6/2004 | Basani et al. | .................. | 709/244 |
| 6,763,372 B1 * | 7/2004 | Dani et al. | ..................... | 709/204 |
| 6,775,668 B1 * | 8/2004 | Goel | .................................. | 707/9 |
| 6,816,882 B1 * | 11/2004 | Conner et al. | ................ | 709/203 |
| 6,839,321 B1 * | 1/2005 | Chiruvolu | ................... | 370/230.1 |
| 6,904,448 B2 * | 6/2005 | Johnson et al. | ................ | 709/201 |
| 6,938,084 B2 * | 8/2005 | Gamache et al. | ............. | 709/226 |
| 6,947,434 B2 * | 9/2005 | Hundscheidt et al. | ......... | 370/401 |
| 6,950,853 B2 * | 9/2005 | Garcia-Luna-Aceves et al. | ............................. | 709/204 |
| 6,963,915 B2 * | 11/2005 | Karger et al. | ................. | 709/226 |
| 6,965,936 B1 * | 11/2005 | Wipfel et al. | .................. | 709/224 |

(Continued)

OTHER PUBLICATIONS

Haas, Z. J. and Liang, B. "Ad Hoc Mobility Management with Uniform Quorum Systems," IEEE/ACM Transactions on Networking, vol. 7, Issue 2, Apr. 1999, pp. 228-240.*

(Continued)

*Primary Examiner* — Lynn Feild
*Assistant Examiner* — Melvin H Pollack
(74) *Attorney, Agent, or Firm* — Haynes and Boone, LLP

(57) ABSTRACT

A method and system is disclosed for dynamically administering a quorum of multiple members based on their involvements in using at least one network resource in a computer network. At least one system administrator responsible for managing a particular network resource will divest his power to the members of the quorum so that his own involvement can be minimized. After identifying one or more stakeholders out of a group of users of the network resource, a weight for each user is updated in one or more rounds of evaluation based on his use of the network resource. The quorum membership is then modified accordingly based on the updated weights of the users so that the network resource is managed appropriated by relevant users.

17 Claims, 1 Drawing Sheet

U.S. PATENT DOCUMENTS

| | | | | |
|---|---|---|---|---|
| 6,980,983 B2* | 12/2005 | Banerjee et al. | ............... | 1/1 |
| 6,985,956 B2* | 1/2006 | Luke et al. | ............... | 709/229 |
| 6,986,015 B2* | 1/2006 | Testardi | ............... | 711/202 |
| 6,993,587 B1* | 1/2006 | Basani et al. | ............... | 709/229 |
| 7,007,235 B1* | 2/2006 | Hussein et al. | ............... | 715/751 |
| 7,016,946 B2 | 3/2006 | Shirriff | ............... | 709/221 |
| 7,020,082 B2 | 3/2006 | Bhagavath et al. | ............... | 370/230 |
| 7,054,935 B2 | 5/2006 | Farber et al. | ............... | 709/226 |
| 7,076,783 B1* | 7/2006 | Frank et al. | ............... | 719/313 |
| 7,080,073 B1* | 7/2006 | Jiang et al. | ............... | 1/1 |
| 7,080,136 B2 | 7/2006 | Duffield et al. | ............... | 709/223 |
| 7,089,293 B2* | 8/2006 | Grosner et al. | ............... | 709/217 |
| 7,117,246 B2 | 10/2006 | Christenson et al. | ............... | 709/206 |
| 7,120,694 B2 | 10/2006 | Sinha | ............... | 709/228 |
| 7,130,807 B1* | 10/2006 | Mikurak | ............... | 705/7 |
| 7,136,489 B1* | 11/2006 | Madhusudhana et al. | ............... | 380/277 |
| 7,136,927 B2 | 11/2006 | Traversat et al. | ............... | 709/230 |
| 7,155,518 B2 | 12/2006 | Forslow | ............... | 709/227 |
| 7,168,088 B1* | 1/2007 | Matena | ............... | 726/3 |
| 7,173,929 B1 | 2/2007 | Testardi | ............... | 370/355 |
| 7,248,841 B2* | 7/2007 | Agee et al. | ............... | 455/101 |
| 7,251,689 B2* | 7/2007 | Wesley | ............... | 709/224 |
| 7,277,952 B2 | 10/2007 | Nishanov et al. | ............... | 709/229 |
| 7,307,954 B1* | 12/2007 | Strandberg et al. | ............... | 370/235 |
| 7,313,614 B2 | 12/2007 | Considine et al. | ............... | 709/223 |
| 7,328,243 B2* | 2/2008 | Yeager et al. | ............... | 709/205 |
| 7,340,500 B2 | 3/2008 | Traversat et al. | ............... | 709/201 |
| 7,362,702 B2 | 4/2008 | Terrell et al. | ............... | 370/230 |
| 7,389,290 B2* | 6/2008 | Adar et al. | ............... | 1/1 |
| 7,403,931 B2* | 7/2008 | Tayebnejad et al. | ............... | 706/21 |
| 7,441,045 B2 | 10/2008 | Skene et al. | ............... | 709/241 |
| 7,454,516 B1* | 11/2008 | Weinert et al. | ............... | 709/235 |
| 7,483,871 B2* | 1/2009 | Herz | ............... | 1/1 |
| 7,496,655 B2 | 2/2009 | Gopalan et al. | ............... | 709/224 |
| 7,509,274 B2 | 3/2009 | Kam et al. | ............... | 705/35 |
| 7,512,649 B2 | 3/2009 | Faybishenko et al. | ............... | 709/201 |
| 7,584,262 B1 | 9/2009 | Wang et al. | ............... | 709/217 |
| 7,617,292 B2 | 11/2009 | Moore et al. | ............... | 709/216 |
| 7,653,689 B1 | 1/2010 | Champagne et al. | ............... | 709/206 |
| 7,706,359 B2* | 4/2010 | Pounds et al. | ............... | 370/353 |
| 7,707,287 B2 | 4/2010 | Shafir et al. | ............... | 709/225 |
| 7,752,251 B1 | 7/2010 | Shuster et al. | ............... | 709/200 |
| 7,764,231 B1 | 7/2010 | Karr et al. | ............... | 342/457 |
| 7,765,329 B2 | 7/2010 | Cruciani et al. | ............... | 709/250 |
| 7,797,367 B1* | 9/2010 | Gelvin et al. | ............... | 709/200 |
| 7,814,058 B2 | 10/2010 | Beck | ............... | 707/649 |
| 7,827,302 B2 | 11/2010 | Weinert et al. | ............... | 709/235 |
| 7,945,655 B2* | 5/2011 | Lisiecki et al. | ............... | 709/223 |
| 8,001,222 B2* | 8/2011 | Beck | ............... | 709/221 |
| 8,015,263 B2* | 9/2011 | Bartholomew | ............... | 709/219 |
| 8,037,202 B2* | 10/2011 | Yeager et al. | ............... | 709/238 |
| 8,041,735 B1* | 10/2011 | Lacapra et al. | ............... | 707/783 |
| 2001/0034640 A1* | 10/2001 | Chaum | ............... | 705/12 |
| 2002/0103695 A1* | 8/2002 | Urken et al. | ............... | 705/12 |
| 2002/0147623 A1* | 10/2002 | Rifaat | ............... | 705/7 |
| 2002/0151992 A1* | 10/2002 | Hoffberg et al. | ............... | 700/83 |
| 2003/0055898 A1* | 3/2003 | Yeager et al. | ............... | 709/205 |
| 2003/0189592 A1* | 10/2003 | Boresjo | ............... | 345/751 |
| 2003/0191676 A1* | 10/2003 | Templeton | ............... | 705/8 |
| 2003/0229845 A1* | 12/2003 | Salesin et al. | ............... | 715/500 |
| 2003/0233274 A1* | 12/2003 | Urken et al. | ............... | 705/12 |
| 2006/0078863 A1* | 4/2006 | Coleman et al. | ............... | 434/322 |
| 2006/0100897 A1* | 5/2006 | Halloran et al. | ............... | 705/1 |
| 2006/0155513 A1* | 7/2006 | Mizrahi et al. | ............... | 702/179 |
| 2007/0203741 A1* | 8/2007 | Ordille et al. | ............... | 705/1 |
| 2009/0234878 A1* | 9/2009 | Herz et al. | ............... | 707/102 |
| 2011/0219108 A1* | 9/2011 | Lisiecki et al. | ............... | 709/223 |

OTHER PUBLICATIONS

Peleg, David and Wool, Avishai. "Crumbling Walls: A Class of Practical and Efficient Quorum Systems," Distributed Computing, vol. 10, No. 2, Feb. 1997, pp. 87-97.*

Naor, M. and Wool, A. "The Load, Capacity and Availability of Quorum Systems," 35$^{th}$ Annual Symposium on Foundations of Computer Science, Nov. 20-22, 1994, pp. 214-225.*

Irvine, C.E. and Levin, T.E. "Toward Quality of Security Service in a Resource Management System Benefit Function," Proceedings 9$^{th}$ Heterogeneous Computing Workshop, 2000, pp. 133-139.*

Mitchell, Ronald K. et al. "Toward a Theory of Stakeholder Identification and Salience: Defining the Principle of Who and What Really Counts," The Academy of Management Review, vol. 22, No. 4, Oct. 1997, pp. 853-886.*

Tuexen, M. et al. "Requirements for Reliable Server Pooling," RFC 3237, Jan. 2002, pp. 1-10.*

Yavatkar, R. et al. "SBM (Subnet Bandwidth Manager): A Protocol for RSVP-based Admission Control over IEEE 802-Style Networks," RFC 2814, May 2000, pp. 1-60.*

Amsden, P. et al. "Cabletron's Light-Weight Flow Admission Protocol Specification Version 1.0," RFC 2124, Mar. 1997, pp. 1-21.* http://www.bindview.com.

http://www.quest.com/solutions, microsoft_infrastructure.asp, *Microsoft Infrastructure Management*.

http://www.netiq.com.

http://www.washingtontechnology.com/news/14_11/tech_features, *Windows 2000*, vol. 14 No. 11, Aug. 30, 1999.

http://www.entmag.com/archives/article.asp, *Archive Article—Bindview Reaches Out to Entevo to Diversify*, Feb. 2000.

http://www.novell.com/news/press/pressroom/partner/archive, *Oblix Leverages Novell NDS eDirectory*, Mar. 23, 2000.

* cited by examiner

METHOD AND SYSTEM FOR MANAGING NETWORK RESOURCES BASED ON A DYNAMIC QUORUM

TECHNICAL FIELD

The present invention relates to computer networks and, more particularly, to a method and system for managing network resources based on a dynamic quorum in a computer network environment.

BACKGROUND INFORMATION

As the size and complexity of computer networks increase, administration of network users and resources is a tedious job. For instance, the traditional way of managing application servers in a network involves an administrator or a group of administrators who are responsible for having the best interests of all their users in mind (in line with the usage policy if one exists) and for making administrative decisions that affects service quality or functionality. As such, administration of application server resources has always been one of the cost intensive areas in terms of time and manpower in the operation of a business. For example, for those networks whose resource allocation is based on directory, a variety of tools have been developed to automate repetitive chores of administration. Such tools like NetIQ, Entevo, Quest, Bindview, etc. are specific to certain directory software platforms. The general methodology for the administration tools is to automate and simplify tasks so that a self-management mechanism can be implemented.

Out of a group of users of a particular resource, there are a subgroup/quorum of stakeholders affected by almost every administrative operation on the resource. Ideally, the administrator is expected to take the opinions of these stakeholders into consideration. Based on how much they depend on the resource, some users have higher stake than others. As such, even in a group of stakeholders, they may have varying levels of dependency on the resource, and hence varying levels of stake of the quorum. In practice, this makes the process of getting to know the list of users/stakeholders and their dependencies in different parts of the network services or resources difficult. In fact, users of a computer network system would be willing to participate in decision making of an administrative nature if the decision had a direct impact on any aspect of their primary interests. For example, on a network file system, a user would be interested in the right to delete files he uses in a common area that are also accessible by other users. With the advent of peer-to-peer systems, a host of user owned services are now well known in today's IT networks. There are a number of software applications that allow users to share files in a peer-to-peer fashion. The success of any such application invariably depends on how well it is managed. As such, what is needed is a mechanism that will help users for providing better utilization of resources they place in the services of their peers, while reducing the load of a centrally managed application administration.

More specifically, what is needed is a dynamic method for allowing the users to manage their interested network resources so as to relieve the burden on "labor intensive" network administration by designated administrators.

SUMMARY OF THE INVENTION

A method and system is disclosed for dynamically administering a quorum of multiple members based on their involvements in using at least one network resource in a computer network. At least one system administrator responsible for managing a particular network resource will divest his power to the members of the quorum so that his own involvement can be minimized. After identifying one or more stakeholders out of a group of users of the network resource, a weight for each user is updated in one or more rounds of evaluation based on his use of the network resource. The quorum membership is then modified accordingly based on the updated weights of the stakeholders so that the network resource is managed appropriated by relevant users.

DETAILED DESCRIPTION OF THE INVENTION

Figure 1:
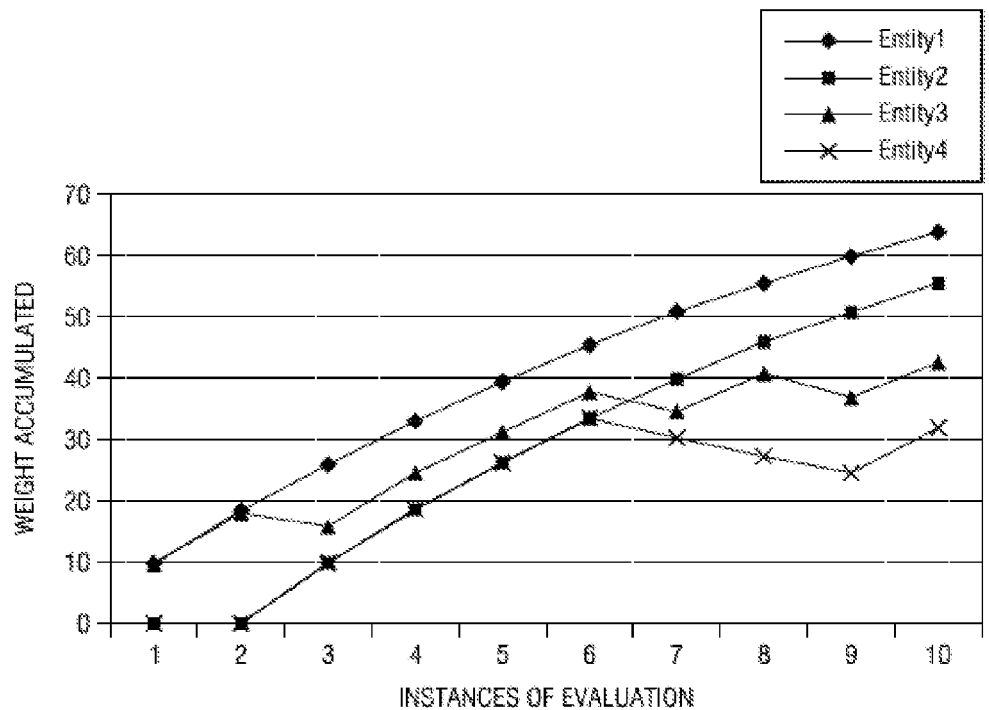
FIGS. 1 and 2 illustrate graphs showing weight accumulation for a group of users in different rounds of evaluation.

The present disclosure will be described below in more details. Although the network resources can be of any form, in the disclosure below, the network application service is used as one example. For example, a group of users are using certain application service in a computer system, and a subset of them form a quorum for deciding the use of the application service by filtering mechanisms according to a predetermined criteria based on their involvements with or usage of the application service. For these stakeholders, they may have certain primary interest in the application service, and they may also have certain secondary interests. For the purpose of this disclosure, a primary interest is defined as the reasons that motivate the user to seek a service. For example, in a file system directory that contains binary objects published by a user which are further used by a number of others as part of a software development workflow. In this case, users of these published objects would have a primary interest in reading them, or the operation "file read," which brings them to use this service. As a contrast, the backup policies of this directory, while of certain interest to this user, may not be of a primary interest. Therefore, the backup policy controlling what, when and how files in the directory should be backed up is considered to be of secondary interest to the user. A primary interest may be understood as an interest arising out from a use of network resource or an operation of the network that has a direct impact on a user, who desires to have his voice heard for such an operation or use. Comparing to the primary interest, a secondary interest arises from a use of network resource or an operation of the network that may have a relatively indirect impact on a user, who may not like to have any control over such an operation or use.

Since the network is still managed largely by the administrators, and the primary objective is to allow the administrator of a service to empower a group of stakeholders to handle a selected operation on a selected resource. The selection criteria of the quorums are thus determined by the administrators as well as the configurations of the quorums themselves. When selected appropriately, the quorums should represent a cross section of users whose decision on the network resource should represent the overall concerns of all involved users.

As described above, a prioritized list of stakeholders must be identified under certain current condition pertaining to the predetermined criteria. As a given individual or user's involvement in an operation varies proportionately to its primary interest in the concerned resource, and his or her interests change from time to time, the stakeholder identification process must be designed in a very dynamic fashion.

In one example, a system of weights is used to represent the stakes users have in participating the decision quorum and making the decision. Based on certain configuration parameters which control how users will score, the "weight" of each participating user is updated at every round of stake evaluation or scoring based on whether the user has participated or not. A mathematical representation of the weight-assigning process is further described below, wherein A denotes the maximum attainable score per user, E the group of stakeholders, τ a programmable configuration parameter, I the initial score, and $S^i_n$ the weight of the i-th user at n-th evaluation. Let Δ be the time difference between successive rounds of stake evaluation. If time does not have a bearing on a specific application, then Δ=1. Alternatively, Δ could also be an indicator of the time elapsed from the beginning round of evaluation or in the form of the sequence number of the stake evaluation round. It is then obvious that, initially, $S^i_0$=I, where $0 \leq I \leq A$ and i∈E. If the $i^{th}$ user participates in n-th round of evaluation, then $$S^i_n = S^i_{n-1} e^{-(\tau/\Delta)} + A(1 - e^{-(\tau/\Delta)}) \quad [1]$$

If $i^{th}$ user does not participate in n-th round then, $$S^i_n = S^i_{n-1} e^{-(\tau/\Delta)} \quad [2]$$

After the initial score is given, depending on whether or not the users participate and how they participate, their scores are updated. The quantum of increment to the current weight is determined by the value of A, the previous weight, and the value of τ. The parameter τ decides the number of rounds within which a consistently participating user reaches the saturation (very close to maximum score A). As such, the parameters τ and Δ both together give the administrator relatively static way to manage the dynamic quorum.

The update algorithm should capture the participation patterns or resource usage patterns of the users, and represent that to a single numeric value. The administrator has to use various data sources including the usage patterns in the past to predict the future behavior of the resource usage. For example, an administrator with the knowledge of users' past behavior may wish to grant certain users the stakeholders' role in a quorum for a particular collaborative resource after they have participated in eight successive rounds of evaluation. This, in turn, decides what the value of τ/Δ should be. Obviously, this ratio differs significantly for particular resources since it tries to represent the administrator's decisions on particular user groups.

For a given value of τ, it can be designed in such a way that the weight increments are relatively larger to start with. That is, when the user begins to participate initially (or has a weight very close to the bottom), they increment faster for the first few rounds, and as the participation level increases, the increments are actually in small units. Similarly, weight decrements are larger when the current weight is closer to the bottom portion of the curve and relatively smaller as the participant gains a certain amount of weight and moves up in the curve.

The rate of the increments or decrements can be controlled by the value of τ. In one example, for the larger values of τ, the increment or decrement would be smaller, which means the curve takes a longer time to saturate. As τ get close to 0, the $S_n - S_{n-1}$ (increment/decrement) tends to be close to A, the saturation weight. Therefore, since the threshold for adding or expelling members in the quorum is related to the value of τ, τ captures the resource administrator's perception of the amount of consistent usage by the users. If he wishes, the user can also be classified in different groups in terms of their stakes in the quorum. The above-described process also allows the administrator to fine control how he should provide weights to the users by having a different value of τ for formula [1] and [2] above. In another example, in more complicated scenarios, the administrators may use different values of τ for a range of weights. Suppose the maximum weight of A is 1000 and the τ-values changes. If 0<S<250, then τ=τ$_1$=10, but if 250<=S<1000, then τ=τ$_2$=90. It can also be designed in such a way that the more regularly participating users are found to have weights closer to A than the non-participating ones. In this way, the weight for each user is calculated and accumulated, and the membership of the quorum is managed accordingly.

For illustration purposes, consider four users (stakeholders), numbered 1 to 4, participating in a decision evaluation process. The parameters are set as τ=10, A=100 and Δ=1, and it is expected that a user reaches the saturation in about 50 steps if it participates regularly. The results of weight accumulated by the users up to 10 rounds of evaluation are shown in FIG. 1. It can be seen that the user-1 is the most consistent of all up to 10 rounds of stake evaluation and probably the first user to reach saturation. The user-2 does participate regularly from the second evaluation round onwards and closely follows user-1. The user-3 and user-4 are somewhat irregular.

Once users related to a particular network resource are associated with different weights based on their usage patterns, a quorum needs to be formed in order to further manage the network resource. For instance, the administrator can specify the size of the quorum in form of percentage ratio. In addition, a threshold weight T can be specified, above which the users will be included. The administrator may also set a minimum number of users needed for the quorum. This ensures that the quorum will be of a certain size for managing the network resource. Also, the enrollment/addition and disenrollment/deletion of members in the quorum is based on the weights of the members in the most recent round of evaluation. If the weight falls below the threshold T, the member would be a candidate for disenrollment. If the weight of another user increases above T, he will be admitted as a stakeholder of the quorum.

Referring back to FIG. 1, if the threshold for the quorum membership is fixed at 60 in terms of the weight value, then only user-1 qualifies for the membership after the 9th round of stake evaluation. If the threshold is relaxed to 50, then both user-1 and user-2 become members of the quorum at the 9th round. Similarly, if the threshold is 30, after the 6th stake evaluation, all four users will qualify to be members of the quorum. However, the user-4 loses his stakeholder status by the 8th evaluation due to non-participation.

Once such a quorum is created and maintained, the quorum can be used in various ways to make decisions on how a network resource can be managed. Examples of using such quorums can be found in U.S. patent application Ser. No. 10/082,854, entitled "A Method and System for Amassment of Authorization in a Computer System," which is herein incorporated by reference in its entirety.

Figure 2:
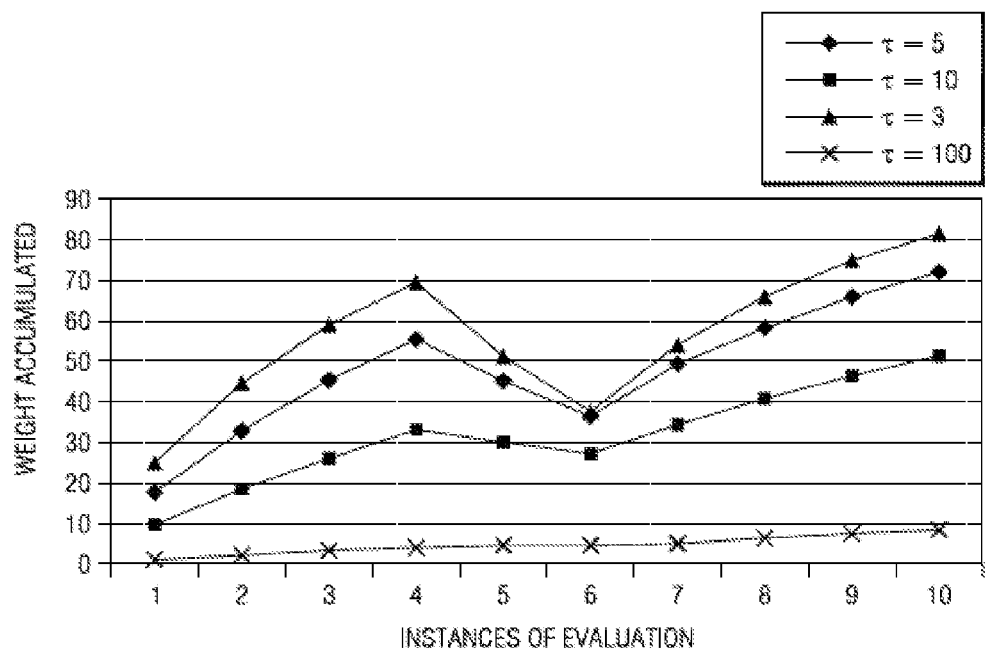

As stated above, the weight accrued by an user can be affected by appropriately setting the value of τ. As shown in the FIG. 2, with the parameters A=100 and Δ=1, the variation of τ is between 3 and 100, the curves in FIG. 2 look totally different from those in FIG. 1. It is understood that the smaller the τ, the earlier the user reaches the saturation. On the other side, the penalty is more severe for non-participation although the recovery is fast by the same token. As mentioned above, it is not necessary to have the same value of τ for both rewarding and reducing weights. Choosing different values of τ depending upon the needs of the application is a very practice-oriented exercise, which largely depends on the experience of the administrator and the usage history of network resources.

In the network environment, various quorums can be set up following the same principle described above. For example, separate quorums can be established to manage tasks such as administration of public or shared file system volumes, administration of shared folders in an email software, or administration of web resources.

It may be noted that the above process of quorum membership could be used to make a recommendation to the application administrator that a particular user has met certain criteria for inclusion or exclusion, rather than allow/disallow membership automatically.

The present disclosure does not require a software or application rewrite. Using the existing applications, every application server can log application events in an audit log. A software module implementing the above algorithms for quorum membership could then analyze the audit log for relevant events and act in a recommendatory (notifications to app server admin expecting him to take action) or otherwise direct fashion (sending quorum configuration messages). This software module can review the audit log at periodic intervals of time, if necessary.

It is understood that several modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A method for dynamically determining a quorum having one or more members based on their involvements in using at least one network resource in a computer network, the method comprising:
    identifying one or more stakeholders having a primary interest in the network resource;
    periodically conducting rounds of evaluation to determine for each stakeholder an amount that the stakeholder has participated in use of the network resource since an immediately preceding evaluation round;
    for each evaluation round, a computer updating a weight by an incremental amount for each stakeholder, wherein the incremental amount is based on the determined amount of participation in use of the network resource for the stakeholder and a predetermined configuration parameter; and
    after each evaluation round, modifying a membership of the quorum based on the updated weights of the stakeholders, wherein for each of the stakeholders, the stakeholder is included in the quorum membership if the updated weight of the stakeholder has a first relationship to a threshold weight and the stakeholder is excluded from the quorum membership if the updated weight of the stakeholder has a second relationship to the threshold weight,
    wherein changing the value of the predetermined configuration parameter controls the rate of a progress of the weight between different rounds.

2. The method of claim 1 further comprising collectively managing the network resource by the quorum membership.

3. The method of claim 1 wherein the identifying further comprises analyzing usage patterns of the network resource pertaining to each stakeholder.

4. The method of claim 1 wherein the updating further comprises calculating the weight mathematically by $S^i_n = S^i_{n-1} e^{-(\tau/\Delta)} + A(1 - e^{-(\tau/\Delta)})$ for the $i^{th}$ stakeholder participating in the n-th round and $S^i_n = S^i_{n-1} e^{-(\tau/\Delta)}$ for the $i^{th}$ stakeholder not participating in the n-th round, wherein A is the maximum attainable weight, $\tau$ is the predetermined configuration parameter, and $\Delta$ is the time difference between successive rounds.

5. The method of claim 1 wherein the modifying further comprising setting up a required threshold for the weights for qualifying a member to the quorum.

6. The method of claim 1 wherein the modifying further comprising setting up a minimum number of members for administering the membership of the quorum.

7. A method for managing at least one network resource in a computer network by a dynamic user quorum, the quorum admitting one or more members based on their minimum involvements in using the network resource, the method comprising:
    identifying one or more stakeholders having a primary interest in using the network resource;
    determining an expected quorum membership requirement over a period of time based on usage patterns of the network resource pertaining to the members;
    periodically conducting rounds of evaluation to determine for each stakeholder an amount that the stakeholder has participated in use of the network resource since an immediately preceding evaluation round;
    for each round of evaluation, a computer updating a weight by an incremental amount for each member, wherein the incremental amount is based on the determined amount of participation in use of the network resource for the member and a predetermined configuration parameter; and
    modifying a membership of the quorum after each round of evaluation based on the updated weights of the stakeholders, wherein for each of the stakeholders, the stakeholder is included in the quorum membership if the updated weight of the stakeholder has a first relationship to a threshold weight and the stakeholder is excluded from the quorum membership if the updated weight of the stakeholder has a second relationship to the threshold weight,
    wherein changing the value of the predetermined configuration parameter controls the rate of a progress of the weight between different rounds.

8. The method of claim 7 wherein the updating further comprises calculating the weight mathematically by $S^i_n = S^i_{n-1} e^{-(\tau/\Delta)} + A(1 - e^{-(\tau/\Delta)})$ for the $i^{th}$ stakeholder participating in the n-th round and $S^i_n = S^i_{n-1} e^{-(\tau/\Delta)}$ for the $i^{th}$ stakeholder not participating in the n-th round, wherein A is the maximum attainable weight, $\tau$ is the predetermined configuration parameter, and $\Delta$ is the time difference between successive rounds.

9. The method of claim 7 wherein the membership requirement is a required threshold for the weights to qualify a member of the quorum.

10. The method of claim 7 wherein the modifying further comprising modifying the quorum by considering a required minimum number of members to be included in the quorum.

11. A computer program product for dynamically determining a quorum having one or more members based on their involvements in using at least one network resource in a computer network, the computer program product comprising:
    non-volatile computer readable medium having stored thereon instructions for:
        identifying one or more stakeholders having a primary interest in the network resource;
        periodically conducting rounds of evaluation to determine for each stakeholder an amount that the stakeholder has participated in use of the network resource since an immediately preceding evaluation round;

for each of the evaluation rounds, updating a weight by an incremental amount for each stakeholder, wherein the incremental amount is based on the determined amount of participation in use of the network resource for the stakeholder and a predetermined configuration parameter; and after each evaluation round, modifying a membership of the quorum based on the updated weights of the stakeholders by considering at least one predetermined requirement, wherein changing the value of the predetermined configuration parameter controls the rate of a progress of the weight between different rounds.

12. The computer program product of claim 11 wherein the computer-readable medium further has stored thereon instructions for collectively managing the network resource by the quorum membership.

13. The computer program product of claim 11 wherein the instructions for identifying further comprise instructions for analyzing usage pattern of the network resource pertaining to each stakeholder.

14. The computer program product of claim 11 wherein the instructions for updating further includes instructions for calculating the weight mathematically by $S^i_n = S^i_{n-1} e^{-(\tau/\Delta)} + A(1 - e^{-(\tau/\Delta)})$ for the $i^{th}$ stakeholder participating in the n-th round and $S^i_n = S^i_{n-1} e^{-(\tau/\Delta)}$ for the $i^{th}$ stakeholder not participating in the n-th round, wherein A is the maximum attainable weight, $\tau$ is the predetermined configuration parameter, and $\Delta$ is the time difference between successive rounds.

15. The computer program product of claim 11 wherein the instructions for modifying further comprising instructions for setting up a required threshold for the weights for qualifying a member to the quorum.

16. The computer program product of claim 11 wherein the instructions for modifying further comprising instructions for setting up a minimum number of members for administering the membership of the quorum.

17. The method of claim 2 wherein the managing the network resource includes managing administration of file systems volumes and managing administration of web resources.

\* \* \* \* \*